United States Patent [19]
Jellinek

[11] 3,978,344
[45] Aug. 31, 1976

[54] OSMOSIS PROCESS FOR PRODUCING ENERGY

[76] Inventor: Hans H. G. Jellinek, May Road, Rte. 2, Potsdam, N.Y. 13676

[22] Filed: Nov. 8, 1974

[21] Appl. No.: 521,963

[30] Foreign Application Priority Data
Nov. 12, 1973 Japan.............................. 48-736728

[52] U.S. Cl................................. 290/1 R; 60/649; 60/673
[51] Int. Cl.²......................................... F03G 7/06
[58] Field of Search...................... 60/641, 721, 516; 290/1

[56] References Cited
UNITED STATES PATENTS
3,587,227  6/1971  Weingarten et al. ................. 60/721
3,702,532  11/1972  Low et al. ............................ 60/516
3,906,250  9/1975  Loeb ..................................... 290/1

Primary Examiner—Robert K. Schaefer
Assistant Examiner—John W. Redman
Attorney, Agent, or Firm—Flynn & Frishauf

[57] ABSTRACT

A process for generating energy by utilizing the osmotic pressure resulting when two liquids having different chemical potentials are each placed in contact with opposite sides of the same semipermeable membrane. The process is particularly applicable to the production of energy from the system sea water/fresh water. The sea water is in the form of an enclosed body having an outlet orifice in communication therewith. The fresh water passes through the semipermeable membrane causing the osmotic pressure which ejects a stream of salt water through the outlet orifice.

13 Claims, 4 Drawing Figures

OSMOSIS PROCESS FOR PRODUCING ENERGY

BACKGROUND OF THE INVENTION

The invention provides a process for the production of energy utilizing the osmotic pressure which is generated, for instance, by contact of fresh water with a semipermeable membrane and a saline water solution, respectively.

The scarcity of energy has become critical recently and the importance of energy for the present and future is subject to intense discussion these days. The inventor realized this importance and thought of an unused natural energy resource, i.e., mixing of sea water with fresh water equalizing their chemical potentials. Energy inherent in this mixing process has never been utilized. The inventor found that the difference in chemical potentials between fresh water and sea water can be utilized as an energy source by making use of the osmotic process. Aqueous saline solution is ejected due to osmotic pressure from a vessel containing this aqueous saline solution in contact with fresh water via a semipermeable membrane.

SUBJECT MATTER OF THE INVENTION

A stream of salt water having kinetic mechanical energy which may be used to turn a mechanical device or otherwise converted into other forms of energy is ejected from an outlet orifice of a closed body of salt water. A portion of that body of salt water is in contact with a semipermeable membrane. A body of fresh water is in contact with the other side of the same semipermeable membrane. Fresh water will pass through the semipermeable membrane into the salt water resulting in a build-up of osmotic pressure which causes salt water to be ejected through the outlet orifice. The body of fresh water does not necessarily have to be in a closed container; it is only necessary that there should be a mass of fresh water in contact with the semipermeable membrane. The invention provides means for replenishing the supply of fresh water in contact with the semipermeable membrane.

The passage of the fresh water through the semipermeable membrane into the salt water results in dilution of the salt water which eventually slows down and limits the production of energy from a given body of salt water. As a consequence the body of salt water must be changed periodically if a batch type process is utilized, or in a continuous process, means are provided for flushing or otherwise replenishing the diluted salt water. Agitation of the body of salt water is also advantageous to remove the build-up diluted salt water from the vicinity of the membrane.

Although the process is described herein in connection with the production of energy utilizing fresh water and sea water, the process is also effective utilizing other liquids so long as the two liquids comprising the system have different chemical potentials.

The energy referred to above can be obtained in the neighborhood of locations where fresh water (rivers) flows into the sea. The technological knowledge in the field of reverse osmosis technology, which is used to produce fresh water from sea-water, can be applied here especially with respect to highly efficient semipermeable membranes and their utilization in production technology. For example, fresh water from a river near the sea coast is introduced into an osmotic pressure generator equipped with a semipermeable membrane. This fresh water is then brough into contact via the semipermeable membrane with sea water which is introduced at the side of the membrane opposite to the one in contact with fresh water. This causes osmotic pressure in the sea-water. If the pressure generated by the flow of fresh water into the sea-water through the membrane is represented by the height of solution which has risen in a pipe installed at the top of the osmotic pressure generator then it is found that the solution rises ca. 256.2 m (based on fresh water) at 20°C for saline water having a concentration of sodium chloride of 35 g in 1000 g of solution. If the pipe is cut at the point where it is joined to the osmotic pressure vessel, then saline solution will flow out of the hole thus produced. If a short nozzle is attached to this hole, the solution will be ejected through the nozzle. If a turbine etc. is rotated by the ejected liquid, then mechanical or electrical energy is obtained. Also, if sea water has once risen to an elevated level in the pipe, it can be dropped actuating a turbine, etc. thus transforming potential energy into mechanical or electrical energy. However, the embodiment of the process in which the saline water is allowed to rise to an elevated level in a pipe is less preferred because this creates a back pressure on the semipermeable membrane and reduces the maximum obtainable work output by about one-half comparable to that obtained when the saline water is ejected through an orifice at or below the level of the top of the body of saline water.

DETAILED DESCRIPTION OF ILLUSTRATED EMBODIMENTS

Figure 1:
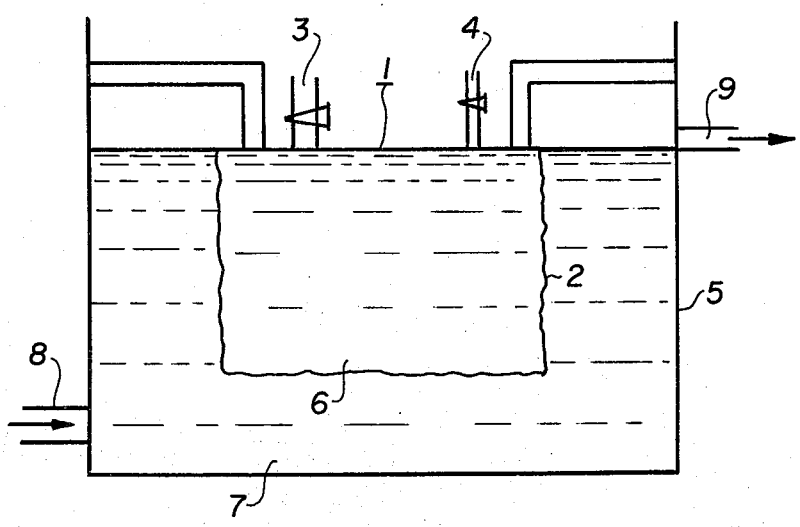
FIG. 1 is a side view of a single osmotic pressure generator according to the present invention.

Referring to FIG. 1 an osmotic pressure generator includes a body of fresh water 7 retained in a fresh water tank 5 and a body of saline water 6 retained within a semipermeable membrane 2, such as a cellulose-ascetate semipermeable membrane. The body of saline water 6 is an enclosed body. In operation, fresh water 7 is introduced into the tank 5 through an inlet 8 and is passed out of the tank through an outlet 9, the level of the fresh water 7 being maintained in the tank almost up to the top of the membrane 2 at the sides of the osmotic generator. Saline water 6 is introduced into the semipermeable membrane 2 through an inlet 3 and a nozzle 4 is provided for ejecting the saline water which is under pressure due to the osmosis phenomenon. In a given embodiment, the saline water 6 is approximately 3.6% salt content.

In order to obtain working pressure fluid from the system, the nozzle 4 is opened to eject saline water which is then coupled to, for example, a small water wheel for generating mechanical energy. If desired, the water wheel may then be connected to an electrical generator, or the like, for generating electrical energy.

Figure 2:
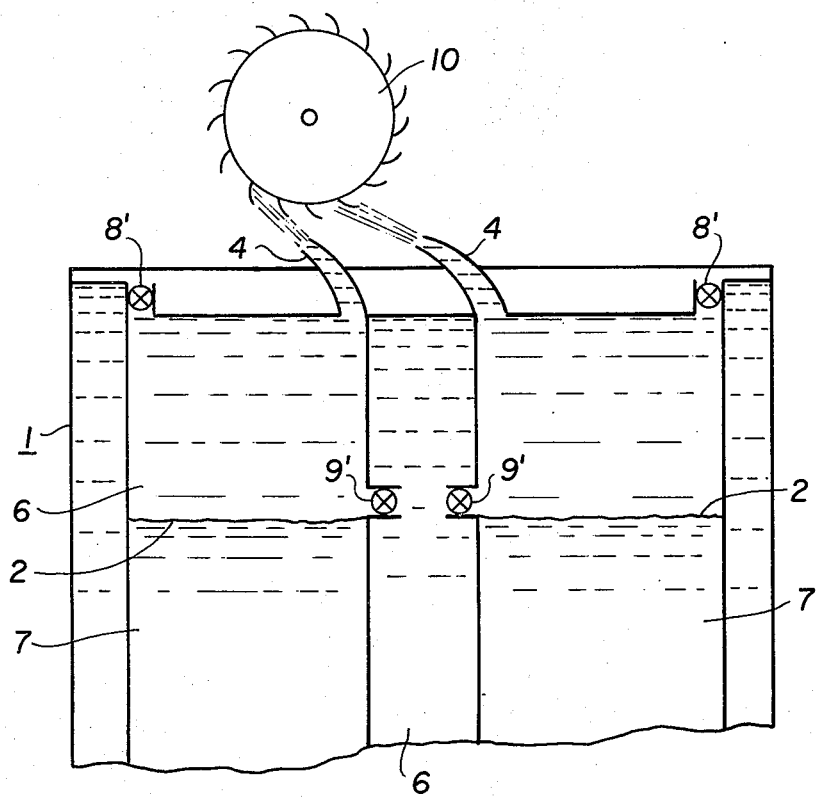
FIGS. 2 and 3 are front and side views, respectively, of a multiple osmotic pressure generator assembly according to the present invention.
Figure 3:
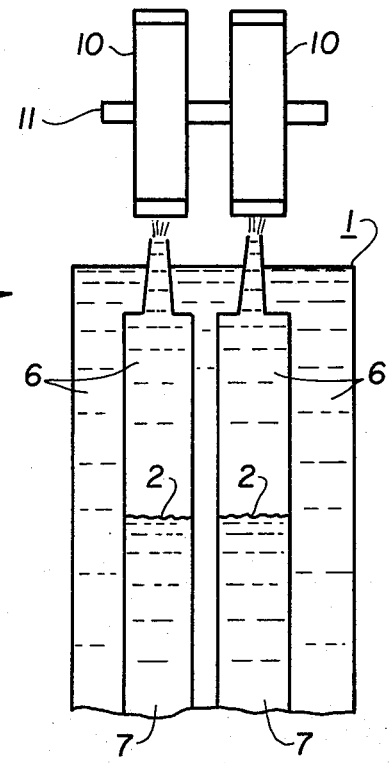

Referring to FIGS. 2 and 3, the same references used in FIG. 1 are used for like elements. In FIGS. 2 and 3, the osmotic pressure generator 1 contains a semipermeable membrane 2, a body of saline water solution 6 being maintained above the semipermeable membrane and a body of fresh water 7 being maintained below the semipermeable membrane. As seen from FIGS. 2 and 3, the generator includes multiple osmotic pressure assemblies therein. In FIGS. 2 and 3, osmotic pressures build up in the upper sections containing the saline water and pressure fluid is ejected via nozzles 4 so as to drive the turbine generators 10. The turbine generators 10 are connected to a single axle 11, but in practice, they may be individually mounted.

In the embodiment of FIGS. 2 and 3, wherein the turbines 10 are commonly mounted to a single axle 11, advantageous operation is achieved in that in the interval between filling and removal of dilute saline water via the inlet 8' and outlet 9' in one of the osmotic pressure generator assemblies, the turbines 10 can be continuously driven by virtue of the ejected solution of the other. Thus, the sections can be recharged on an alternate basis so as to provide continuous power generation. As should be clear, the outlet solution from nozzles 4 in the embodiments of FIGS. 1–3 may be dropped from any desired height before being utilized to produce energy.

Figure 4:
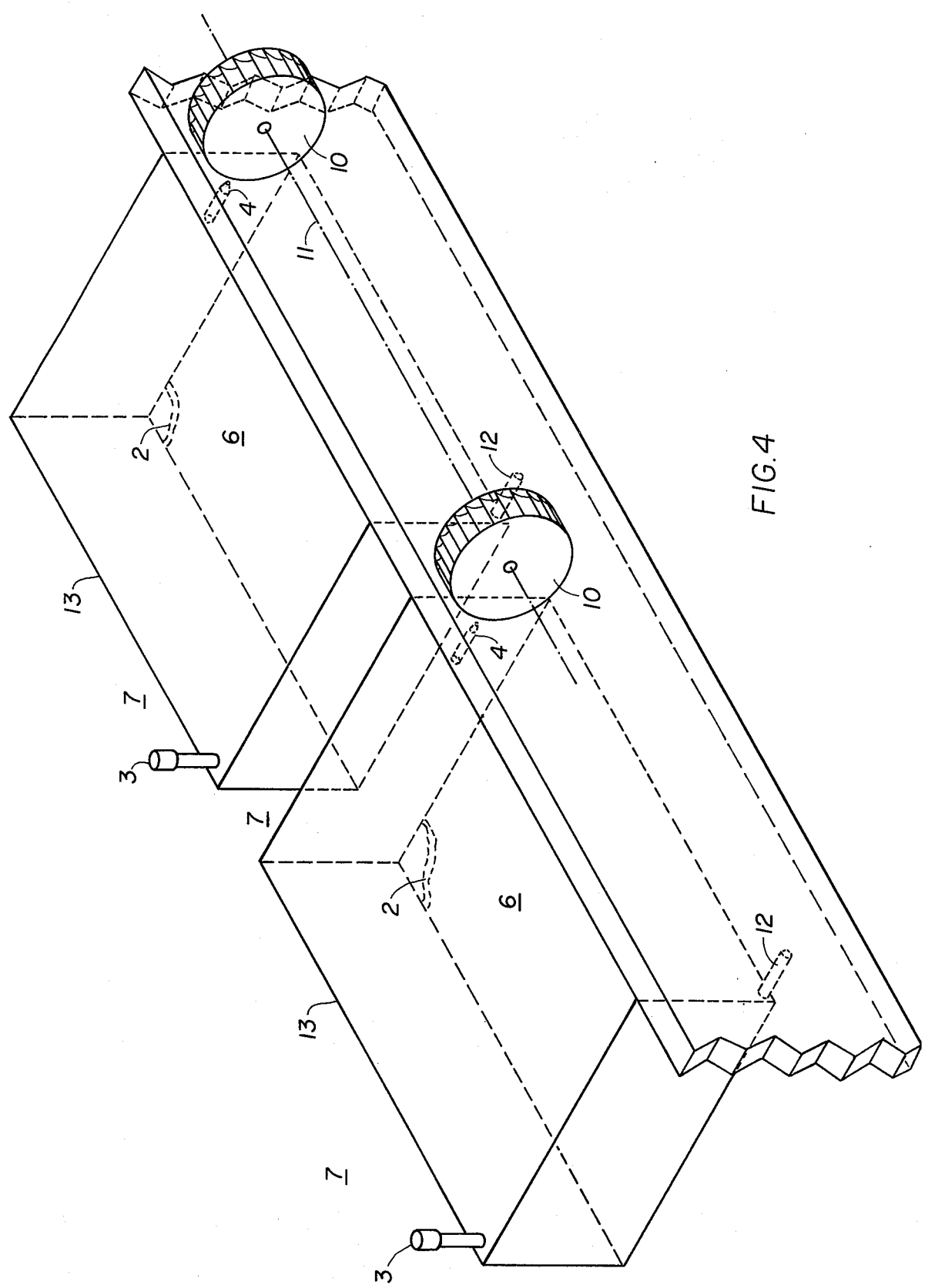
FIG. 4 is perspective view of another embodiment of a multiple osmotic pressure generator according to the present invention.

Referring to FIG. 4, a perspective view of an apparatus similar to the apparatus of FIGS. 2 and 3 is given. Again, the same reference numerals are utilized to designate similar elements to those of the previously described FIGURES. Two containers 13 are provided to contain the saline water 6. the bottom surfaces of the containers 13 are comprised of semipermeable membranes 2, such as the type described above with respect to FIGS. 1–3. An inlet 3 for the saline solution is provided for each tank 13 and an outlet 12 is likewise provided for each tank 13. Further, each tank 13 comprises an outlet nozzle 4 for directing the output pressure fluid to water wheels 10, respectively, which may be mounted on a common shaft 11, as discussed above with respect to FIGS. 2 and 3. Fresh water 7 is provided to surround the containers 13, the fresh water 7 preferably being maintained at a level just below the upper level of the containers 13 and also contacting fully the membranes 2. As should be apparent, and as discussed above with respect to FIGS. 1–3, the outlet pressure fluid from nozzles 4 may be utilized for independently operable water wheels 10, may be dropped a given distance, or may be utilized in any other desired manner so as to convert the osmotic pressure fluid into useful energy.

Further, any number of osmotic pressure generating sections may be cascaded or interconnected, in tandem, as desired.

The maximum work, $\overline{W}_{max}$, which is obtained by this osmotic process can be expressed as follows, $$-\overline{W}_{max} = \int_{n_2}^{n_1} RT \ln a_w \, dn \quad (1)$$

where $n_1$ and $n_2$ are the number of moles at the initial and final points of the process, $a_w$ is the activity of water in saline water of definite concentration during the process, R is the ideal gas constant and T is the absolute temperature.

Sea water has an electrolyte content equivalent to 3.5% by weight of sodium chloride producing an osmotic pressure of $\pi_o = 24.8$ atm. at 20°C. The maximum (reversible) work which can be obtained from such a system if 1 l of water enters a large amount of sea-water through a semi-permeable membrane, assuming negligible dilution is $6.58 \times 10^{-4}$ kwhr or $2.5622 \times 10^2$ kgm.

Maximum power is generated if fresh water enters an osmotic cell at a rate of $$(dv/dt) \, (l/\text{sec})$$
$$h=0$$

(i.e., no back pressure, weight of the water column is zero) representing a very small linear flow rate through a semipermeable membrane of surface area $A_m$ (m²) and the solution issues from an orifice at the top or even better, side of the osmotic cell. This outflow of liquid creates a propulsive force which generates an extremely small back pressure on the membrane. If the liquid is allowed to rise in a tube to a height h ($h > h_o$ where $h_o$ is the equilibrium height) then the maximum power output $P_{max}$ consists of potential and kinetic energy, $$P_{max} = \overset{o}{m}gh + \frac{\overset{o}{m}}{2} v_{t,h}^2 \quad \frac{Nm}{\text{sec}} \quad (2)$$

or $$P_{max} \text{ kinetic component} = 2.562 \times 10^2 \cdot \frac{dv}{dt}\bigg|_{h=0} \cdot \frac{h_o-h}{h_o} \quad \frac{kgm}{\text{sec}} \quad (2a)$$

$m$ and $v_t$ are the mass flow rate and linear velocity, respectively, in the tube. Friction is not considered. The position of the outlet orifice is important to obtain the maximum amount of work from the process. As noted, if instead of an outlet orifice, the salt water is permitted to rise into an outlet pipe to the height determined by the osmotic pressure and the salt water then taken from an orifice at the top of the level to which the salt water has risen, the amount of useful work obtainable from the system is decreased by about half. This is a consequence of the back pressure which the added column of salt water adds to the body of salt water and through the body of salt water to the semipermeable membrane. It is advantageous to position the outlet orifice approximate the level of the top of the body of salt water. It may however be positioned at levels above the top of the body of salt water, with the amount of useful energy obtainable by the process decreasing with increase in height of the outlet orifices above the top of the body of salt water. It is possible to position the outlet orifice below the level of the top of the body of salt water. This would require an outlet orifice valve or nozzle constructed so that there is a back pressure from the outlet orifice at least equal to the pressure generated by the "head" of liquid above said outlet orifice in the body of salt water. If the outlet orifice did not generate such back pressure, the top level of the body of salt water would drop to the level of the outlet orifice.

The invention is further illustrated by the following example:

EXAMPLE

A saline solution of osmotic pressure $\pi_o = 24.8$ atm. The membrane has a volume flow rate for 1 m² membrane area of $dv/dt = 4.2 \times 10^{-3}$ l/sec at $\pi_o$. Present-day membranes can have fluxes 10 to 20 times larger than the one above. The volume of the osmotic cell $V_o = 10^3 l = 1$ m³. Dilution is negligible during operation (during ca. 1 hour, the dilution is less than 2 %).

Equation (2) yield for $h = 0$ a maximum power output of $1.055 \times 10^{-2}$ kw; $m = 4.2$ g$_{(mass)}$/sec, and the maximum linear flow rate from the orifice $$v_l = \frac{2\pi_o}{\rho}^{1/2} = 70.9 \text{ m/sec}$$

where $\rho$ is the density of the saline solution. The minimum cross-section radius of the orifice is $1.37 \times 10^{-2}$ cm. The cross-sectional area of the orifice and the linear velocity of fluid through it must match the influx through the membrane.

For $A_m = 10^2$ m², $V_o = 10^6 l$, the maximum power output is 1.06 kw and the orifice radius $1.37 \times 10^{-1}$ cm; for $A_m = 10^6$ m², and $V_o = 10^6$ m the output is $1.06 \times 10^4$ kw. and the orifice radius is 13.7 cm. The linear velocity through the orifice remains constant at 70.9 m/sec.

A present-day ultrathin membrane can deliver a power output for the last case quoted above of $10^5$ to $10^6$ kw.

Losses during acutal operation will be due to (1) dilution of sea water near the membrane, (2) frictional losses in jets, (3) losses suffered during conversion of mechanical to electrical energy. Losses under (1) can be minimized by stirring. Flow in the nozzles is turbulent. It is estimated that the losses here are not larger than 4 %.

It is farily safe to assume that the total losses are not larger than about 25 % of the maximum power output.

The cost of the process can be estimated by considering the cost of the reverse osmosis process. The main difference between the process described here and that of reverse osmosis is due to high pressure pumping. The cost of ultra-thin membranes and their support is practically negligible. It is estimated that electricity produced from osmotic work compares favorably with the cost of electricity from nuclear energy and will become increasingly cheaper than electricity produced by fossil fuels. In addition, faster membranes are continuously produced for reverse osmosis. The pressures involved in the osmotic work process are so much smaller than those needed for reverse osmosis that extremely thin membranes can be used for producing energy from osmosis. The six largest rivers in the U.S. flowing into oceans have a maximum power output for the osmotic process equivalent to about 10 % of the present day electrical power of the U.S. In addition, the process does not present any hazards due to pollution.

S. Sourirajan's book "Reverse Osmosis", Academic Press, New York, 1970, which discloses details of materials, equipment, process conditions, and costs thereof, which are applicable to the process of the present invention, is incorporated by this reference.

While the present invention has been described above with respect to specific embodiments, it should be clear that various alterations and modifications can be made by those ordinarily skilled in the art within the scope and spirit of the invention as defined in the appended claims.

I claim:

1. A process for generating kinetic mechanical energy from a body of fresh water and a body of salt water comprising
    separating bodies of fresh water and salt water with a semipermeable membrane which is in contact with both bodies,
    locating an outlet orifice in communication with said body of salt water, said outlet orifice having a predetermined minimum cross-sectional area for maximum power output such that the minimum cross-sectional area equals the influx of fresh water to said salt water divided by the maximum linear flow rate at the orifice,
    passing liquid from said body of fresh water through said semipermeable membrane into said body of salt water, and
    ejecting liquid from said body of salt water through said outlet orifice under pressure created by passage of said fresh water through said membrane thereby producing a stream of liquid possessing said kinetic mechanical energy.

2. A process for generating kinetic mechanical energy from a body of fresh water and a body of salt water comprising
    separating bodies of fresh water and salt water with a semipermeable membrane which is in contact with both bodies,
    locating an outlet orifice above the upper level of said body of salt water and in communication with said body of salt water,
    passing fresh water from said body of fresh water through said semipermeable membrane into said body of salt water, to raise a portion of said salt water to the level of said outlet orifice to produce a predetermined amount of potential energy, and
    ejecting salt water through said outlet orifice, thereby converting at least a portion of said potential energy into kinetic mechanical energy and producing a stream of salt water possessing at any given point, said converted kinetic mechanical energy and the remainder of the unconverted potential energy.

3. The process of claim 2 further comprising replenishing the supply of water in said respective bodies.

4. The process of claim 1 further comprising positioning the said outlet orifice approximate the upper level of said body of salt water.

5. The process of claim 4 wherein said stream of water ejected through said outlet orifice is contacted with a rotary mechanical means for converting the kinetic mechanical energy of a stream of liquid into rotary mechanical energy.

6. The process of claim 5 wherein said rotary mechanical means is connected to an electrical generating means whereby electrical energy is produced.

7. The process of claim 2 wherein said stream of water ejected through said outlet orifice is contacted with a rotary mechanical means for converting the kinetic mechanical energy of a stream of liquid into rotary mechanical energy.

8. The process of claim 7 wherein said rotary mechanical means is connected to an electrical generating means whereby electrical energy is produced.

9. Apparatus for generating kinetic mechanical energy comprising:

first container means comprising a wall portion including a semipermeable membrane for containing a body of salt water in contact with said semipermeable membrane and in a substantially closed state;

a body of fresh water surroundig at least a portion of said first container means and contacting said semipermeable membrane; and an outlet orifice coupled to said first container means, said outlet orifice including nozzle means for ejecting salt water under pressure created by passage of said fresh water through said membrane into said salt water to thereby produce a stream of water possessing kinetic mechanical energy, said outlet orifice having a predetermined minimum cross-sectional area for maximum power output such that the minimum cross-sectional area equals the influx of fresh water to said salt water divided by the maximum linear flow rate at the orifice.

10. Apparatus according to claim 9 further comprising means located adjacent said orifice for receiving said pressurized stream of water and for converting said kinetic mechanical energy into another form of energy.

11. Apparatus according to claim 10 wherein said energy conversion means includes a water wheel located adjacent said outlet orifice for converting said kinetic mechanical energy into rotary energy.

12. Apparatus according to claim 9 comprising at least two container means for containing two separated bodies of salt water, each of said container means including a semipermeable membrane wall portion in contact with said fresh water, each of said container means having an outlet orifice which includes a nozzle for producing a stream of pressurized water possessing said kinetic mechanical energy.

13. Apparatus according to claim 9 wherein said outlet orifice is located substantially at the upper level of said body of salt water.

* * * * *